United States Patent [19]

Sheu et al.

[11] Patent Number: 5,670,125

[45] Date of Patent: *Sep. 23, 1997

[54] PROCESS FOR THE PURIFICATION OF NITRIC OXIDE

[75] Inventors: Lien-Lung Sheu, Scotch Plains; Ramakrishnan Ramachandran, Allendale; Theodore R. Galica, Glen Gardner, all of N.J.

[73] Assignee: The BOC Group, Inc., New Providence, N.J.

[*] Notice: The term of this patent shall not extend beyond the expiration date of Pat. No. 5,514,204.

[21] Appl. No.: 533,121

[22] Filed: Sep. 25, 1995

Related U.S. Application Data

[63] Continuation-in-part of Ser. No. 129,647, Sep. 30, 1993, abandoned.

[51] Int. Cl.[6] .................................................. B01J 8/00
[52] U.S. Cl. .................. 423/239.2; 423/405; 95/129; 95/902
[58] Field of Search ........................... 95/117, 128, 129, 95/902; 423/239.1, 239.2, 405; 502/64

[56] References Cited

U.S. PATENT DOCUMENTS

| | | | |
|---|---|---|---|
| 2,882,243 | 4/1959 | Milton | 252/455 |
| 3,674,429 | 7/1972 | Collins | 423/405 |
| 5,158,582 | 10/1992 | Onitsuka et al. | 55/68 |
| 5,417,950 | 5/1995 | Sheu et al. | 423/239.2 |
| 5,514,204 | 5/1996 | Sheu et al. | 95/92 |

*Primary Examiner*—Michael Lewis
*Assistant Examiner*—Thomas G. Dunn, Jr.
*Attorney, Agent, or Firm*—Coleman R. Reap; Salvatore P. Pace

[57] ABSTRACT

A gas mixture comprised of nitric oxide and, optionally an inert gas, and containing small amounts of nitrogen dioxide, and perhaps moisture and sulfur dioxide, is purified by passing the gas stream through a bed of zeolite having a silica to alumina ratio not greater than about 200. The concentration of nitrogen dioxide, sulfur dioxide and moisture in the gas stream are reduced to about 1 ppm or less as the gas mixture passes through the bed of zeolite.

25 Claims, No Drawings

1

PROCESS FOR THE PURIFICATION OF NITRIC OXIDE

RELATED APPLICATION

This application is a continuation-in-part application of U.S. patent application Ser. No. 08/129,647, filed Sep. 30, 1993 now abandoned.

FIELD OF THE INVENTION

The present invention is directed to a process for purifying nitric oxide, and more particularly to a process in which nitrogen dioxide is removed from nitric oxide by adsorption.

BACKGROUND OF THE INVENTION

Nitric oxide has recently been found to play an important role in life processes in humans and animals. For example, it helps maintain blood pressure by dilating blood vessels, and kills foreign invaders in the body's immune system. Studies indicate that extraordinary benefits may be obtained by administering small dosages of nitric oxide to patients who suffer from certain illnesses or diseases. Of particular interest is the prospect of reducing pulmonary vasoconstriction in pediatric patients with congenital heart disease complicated by pulmonary artery hypertension by having the patients inhale oxygen-enriched air containing very small concentrations of nitric oxide.

Nitric oxide is a relatively stable gas when it is in the pure state or mixed with an inert gas, such as nitrogen or argon. However when it is mixed with oxygen it reacts rapidly with the oxygen to form nitrogen dioxide, a substance that is highly toxic to humans. The nitrogen dioxide reacts with water to form nitric and nitrous acids, which, when inhaled can cause severe pulmonary oedema, acid pneumonitis or even death. Because of the highly toxic character of nitrogen dioxide, nitric oxide that is intended for inhalation use by humans is generally purified to remove any nitrogen dioxide that is initially in the nitric oxide product as a result of the manufacturing process, and the purified product is stored and shipped in an oxygen-free environment to prevent the subsequent generation of nitrogen dioxide in the storage or shipping container.

Nitric oxide is generally administered to a patient by diluting a nitrogen-nitric oxide concentrate gas containing about 1000 ppm nitric oxide with oxygen or oxygen-enriched air carrier gas to produce an inhalation gas containing nitric oxide in the desired concentration range (usually about 5 to 200 ppm, based on the total volume of the inhalation gas). Calculations based on nitric oxide chemical kinetics suggest that if pure oxygen is mixed with the above-described nitrogen-nitric oxide concentrate to produce a gas mixture having a nitric oxide concentration of 200 ppm, it takes only about 3 seconds for the concentration of nitrogen dioxide in the gas mixture to build up to 3 ppm. The currently accepted upper limit for nitrogen dioxide inhalation is 5 ppm (based on the total volume of breathing gas being inhaled). Assuming that this gas mixture is inhaled by a patient within 3 seconds after mixing the nitrogen-nitric oxide concentrate and oxygen, the amount of nitrogen dioxide initially present in the nitric oxide-nitrogen concentrate would have to be very low to ensure that the nitrogen dioxide concentration in the inhalation gas does not exceed 5 ppm.

Nitrogen dioxide is produced as a byproduct of most, if not all, nitric oxide production processes. Various techniques are employed to remove nitrogen dioxide from the nitric oxide. U.S. Pat. No. 3,489,515 discloses the purification of nitric oxide by washing the nitric oxide with a dilute aqueous solution of nitric acid. The water reacts with the nitrogen dioxide to produce nitric and nitrous acids, which can be washed from the gaseous product stream by washing the stream with water. This method is not satisfactory for producing medical grade nitric oxide because it does not adequately reduce the concentration of nitrogen dioxide in the product gas stream. Nitrogen dioxide can also be removed from nitric oxide by cryogenic distillation. This method likewise leaves a lot to be desired because of the high capital cost of distillation equipment and because not all of the valuable nitric oxide is recovered during the distillation. A third purification that has been reported is adsorption using as adsorbent a bed of the activated coke or activated charcoal (see U.S. Pat. Nos. 2,568,396 and 4,149,858). This procedure suffers from the disadvantages that the activated coke and activated charcoal do not completely remove nitrogen dioxide from the gas stream and they also adsorb more nitric oxide than is desired. U.S. Pat. Nos. 3,674,429 and 4,153,429 describe the removal of nitrogen oxides from gas streams by passing the gas streams through zeolite molecular sieve.

Because of the high toxicity of nitrogen dioxide, highly effective methods for purifying nitric oxide that is to be used in medical applications are continuously sought. The present invention provides a simple and efficient method of achieving this objective.

SUMMARY OF THE INVENTION

According to the process of the invention, a gas mixture comprised of nitric oxide and, optionally an inert gas, and containing small amounts of nitrogen dioxide, and perhaps moisture and sulfur dioxide, is purified by passing the gas stream through a bed of zeolite having a silica to alumina ratio not greater than about 200. The concentration of nitrogen dioxide, sulfur dioxide and moisture in the gas stream are reduced to about 1 ppm or less as the gas mixture passes through the bed of zeolite.

In one embodiment of the invention, a substantially oxygen-free nitric oxide gas stream containing one or more impurities, including nitrogen dioxide, is purified by passing the gas stream through the bed of zeolite, thereby removing nitrogen dioxide from the gas stream. The molar ratio of nitric oxide to nitrogen dioxide in the gas stream is at least 5:1. The concentration of nitrogen dioxide in the gas stream is preferably reduced to not more than about 5 ppm, and is most preferably reduced to not more than about 1 ppm.

In a preferred aspect of the invention, the gas stream being purified contains at least about 1% by volume nitric oxide, and in a more preferred aspect the nitric oxide is present at a concentration of at least about 3%. In another preferred aspect of the invention, the molar ratio of nitric oxide to nitrogen dioxide in the gas stream being purified is at least about 10:1.

In another preferred aspect of this embodiment, the purified gas stream is diluted with an inert gas selected from nitrogen, argon and mixtures of these sufficiently to produce a gas mixture containing 5 to about 5000 ppm nitric oxide. In a more preferred aspect of this embodiment, the gas stream is diluted with inert gas sufficiently to reduce the concentration of nitrogen dioxide in the gas mixture to not more than about 1 ppm. The diluted nitric oxide gas mixture can then be blended with oxygen or oxygen-enriched air to produce a blended mixture containing about 10 to about 100 ppm nitric oxide.

In another embodiment, the nitric oxide gas stream is first diluted with a sufficient amount of an inert gas, such as nitrogen or argon, to reduce the concentration of nitric oxide in the gas stream to about 10 to about 5000 ppm, and the diluted gas mixture is purified by passing it through the bed of zeolite, thereby reducing the concentration of nitrogen dioxide in the diluted gas stream. The nitrogen dioxide concentration is reduced to not more than about 5 ppm, and preferably to not more than about 1 ppm. In one preferred aspect of this embodiment, the concentration of nitric oxide in the diluted gas stream is at least about 80% by volume.

According to a preferred aspect of this embodiment of the invention, the concentration of nitrogen dioxide in the gas stream being treated is reduced to a concentration of about 100 to about 5000 ppm by washing the gas stream with dilute nitric acid and/or water and the washed gas stream is passed through the bed of zeolite to remove nitrogen dioxide. The concentration of nitrogen dioxide in the gas stream is preferably reduced to no more than about 5 ppm, and is most preferably reduced to no more than about 1 ppm.

The conditions at which the adsorption is carried out are not critical. It can be carried out at temperatures in the range of about −50° to about 300° C. or higher, and at absolute pressures in the range of about 0.5 to about 200 bar or higher. To simplify the process, the adsorption is preferably carried out at temperatures in the range of about 0° to about 100° C. and at absolute pressures in the range of 1 to about 10 bar.

Zeolites useable in the process of the invention include types A, X and Y zeolites, mordenite, faujasite, chabazite, etc. Preferred adsorbents include 5A, 13X and 4A zeolites. The most preferred adsorbent is 5A zeolite.

The adsorption is preferably carried out in a battery of two or more adsorption beds arranged in parallel and operated out of phase, so that at least one bed is undergoing adsorption while the adsorbent in another bed is being replaced or regenerated.

DETAILED DESCRIPTION OF THE INVENTION

The nitric oxide that is purified by the process of the invention can be produced by any of several well known manufacturing methods. According to one method, sulfur dioxide and nitric acid are reacted in the presence of water to produce the nitric oxide. A number of byproducts, including sulfuric acid, nitrous oxide (laughing gas) and nitrogen dioxide are produced in this process. The raw product stream also contains unreacted sulfur dioxide. The sulfuric acid is easily removed from the product gas by phase separation followed by water wash. The nitrous oxide does not interfere with the use of the nitric oxide in an inhalation gas since it has a very low toxicity. However, as explained above, nitrogen dioxide, and sulfur dioxide, must be substantially completely removed from the product gas because of the extreme toxicity of these compounds. Moisture is also desirably removed to avoid corrosion problems.

Nitric oxide can also be produced by combusting ammonia with oxygen at temperatures of about 1000° C. Byproducts of this process include nitric acid, nitrous acid, nitrous oxide, nitrogen dioxide and nitrogen. The nitric and nitrous acids can be removed by water washing the product gas. Significant quantities of nitrogen dioxide can be removed from the product gas by water washing it with the dilute nitric acid obtained as a byproduct, and subsequently washing the product gas with substantially pure water. Since this process uses oxygen (or air) as a reactant, and since nitric oxide reacts with oxygen to produce nitrogen dioxide, care must be taken to ensure that all of the oxygen is consumed in the reaction. This can be accomplished by conducting the combustion in the presence of excess ammonia.

A third method of producing nitric oxide is by subjecting air to a high voltage electric arc. This procedure is convenient for on-site production of small quantities of nitric oxide. Side products which must be removed from the nitric oxide produced by this method include nitrogen dioxide and ozone.

Nitric oxide readily reacts with oxygen to produce nitrogen dioxide. Accordingly, the nitric oxide gas stream being purified in this invention must be substantially free from molecular oxygen. By "substantially oxygen-free" is meant that the gas stream contains no more than about 10 ppm oxygen. Preferably the gas stream being purified contains not more than about 5 ppm oxygen.

The nitric oxide-rich gas product made by the above processes may contain nitrogen, depending upon which process is used. This poses no problem with respect to the use of the nitric oxide product in inhalation therapy, because nitrogen is nontoxic and is generally used as a diluent for the nitric oxide.

As mentioned above, the adsorbents used in the invention are the zeolites having a silica-to-alumina ratio of about 200 or less. Included in this class of adsorbents are both natural and synthetic zeolites. A zeolite that has been found to be particularly effective for adsorbing nitrogen dioxide without adsorbing significant amounts of nitric oxide is type 5A zeolite, which is a calcium-exchanged zeolite having a pore size of about 5 angstrom units. Other adsorbents that have been found to be effective in the process of the invention include type 13X zeolite and type 4A zeolite. Still other zeolites that can be used in the process of the invention are type Y zeolites and natural zeolites, such as those mentioned above. Excluded from the class of zeolites useful in the invention is dealuminated type Y zeolite, which has a silica-to-alumina ratio greater than about 200.

The conditions under which the adsorption process is carried out are not critical. The adsorption can be carried out at any temperature below the decomposition temperature of the nitric oxide product and the adsorbent. It is preferred to conduct the adsorption process at a temperature which is congruous with other steps of the product manufacturing process, and particularly at atmospheric temperatures and pressures, if possible. Those skilled in the art can easily determine which operating conditions are best suited for their purposes.

When the nitric oxide product gas is to be used in an inhalation gas it is diluted with an oxygen-free inert gas which is nontoxic to humans and animals and which can be easily blended with oxygen or oxygen-enriched air to make up an inhalation gas having the desired concentration of nitric oxide. Suitable diluent gases include nitrogen, argon, helium, etc. The preferred diluent gas is nitrogen because of the ready availability and low cost of this gas. The nitric oxide-rich gas is preferably diluted with the oxygen-free inert gas to a concentration that can be conveniently blended with the oxygen or oxygen-enriched gas that is used to make up the inhalation gas. Typical inert gas-nitric oxide gas mixtures contain about 5 to about 5000 ppm nitric oxide. Preferred mixtures contain about 5 to about 2000 ppm nitric oxide. The inert gas-nitric oxide mixture can later be blended with oxygen or oxygen-enriched air having an oxygen concentration that will provide the desired oxygen to nitric oxide ratio (usually in the range of about 5 to about 200 ppm nitric oxide) and the desired oxygen to nitrogen ratio.

The process of the invention can be used to directly purify a nitric oxide-rich gas, such as the product obtained from any of the above manufacturing processes, or it can be used to purify an inert gas-nitric oxide concentrate prepared from the nitric oxide-rich gas. In either case the process is effective to reduce the concentration of nitrogen dioxide in the purified gas to about 1 ppm. It is advantageous to purify the nitric oxide-rich gas prior to dilution, because the concentration of nitrogen dioxide in the inert gas-diluted concentrate will be much lower than 1 ppm after the purified nitric oxide-rich gas is diluted with the inert gas.

The process of the invention has the additional advantage of removing other undesirable impurities, such as water vapor and sulfur dioxide, from the gas stream being purified. This is desirable since, as noted above, water introduces the possibility of corrosion problems, and sulfur dioxide is highly toxic.

The nitrogen dioxide-containing adsorbent can be somewhat regenerated. However, it is difficult to efficiently desorb nitrogen dioxide from the zeolite adsorbent; consequently the adsorbent is preferably removed from the adsorbent bed and discarded when it is saturated with nitrogen dioxide. However, moisture can be readily desorbed from the zeolite adsorbent used in the invention. Thus, the useful life of the adsorbent can be somewhat extended by regenerating the adsorbent to remove moisture.

In some cases it may be preferable to remove moisture and/or sulfur dioxide from the gas stream being purified prior to nitrogen dioxide removal. For example, the gas being purified can be first passed through a regenerable bed of alumina or silica to remove moisture, and then passed through the zeolite bed to remove nitrogen dioxide and sulfur dioxide. This option can be used to extend the useful life of the zeolite adsorbent, and is particularly beneficial when the moisture content of the gas being purified is high. The moisture content is preferably reduced to about 20 ppm or less.

The invention is further illustrated by the following examples in which, unless otherwise indicated, parts, percentages and ratios are on a volume basis. A pyrex U-tube 14 inches long and having an ID of 0.75 inch was used in the examples. The adsorbent was packed into the U-tube and a one-half inch layer of cotton wool was inserted into both ends of the tube to hold the adsorbent in place, and to serve as a filter. The test gas was passed through the U-tube at a flow rate of 1 liter/minute. The effluent from the adsorbent bed was collected in a gas holder having an optical path length of 10 meters and a volume of 2.3 liters (made by Infrared Analysis Inc., Anaheim, Calif.) The gas holder was mounted on a BIO-RAD FTS-7 Fourier Transform Infrared (FTIR) spectrometer which recorded the FTIR measurements at a resolution of 2 $cm^{-1}$. To obtain a high signal/noise ratio 256 scans were used. The gas passed through the U-tube at ambient room temperature and was collected in the gas holder at an absolute pressure of 762 to 766 torr.

EXAMPLE I

The above described U-tube was packed with type 5A zeolite and a gas mixture containing 400 ppm nitrogen dioxide, 10 percent nitric oxide and the balance nitrogen was passed through the U-tube and collected in the gas holder. The concentration of nitrogen dioxide in the gas collected in the gas holder was measured one-half hour, one hour, two hours and five hours after flow through the U-tube was initiated. The results are reported in the Table.

EXAMPLES II TO VI

The procedure of Example I was repeated except that type 4A zeolite, type 13X zeolite, dealuminated type Y (DAY) zeolite having sodium ions and protons as the major cations and having a silica to alumina ratio of greater than 200, silica and activated carbon were substituted for the type 5A zeolite. The results of the tests are reported in the Table.

| | | Amount of $NO_2$ Detected, ppm | | | | |
|---|---|---|---|---|---|---|
| Example | Adsorbent | 0.5 hr | 1 hr | 1.5 hr | 2 hr | 5 hr |
| I | 5A Zeolite | 0 | 0 | 0 | 0 | 0 |
| II | 4A Zeolite | 3 | 4 | 5 | 6 | — |
| III | 13X Zeolite | 2 | — | 3 | 4 | — |
| IV | DAY[1] | 17 | 44 | 70 | — | — |
| V | Silica | 30 | 57 | 75 | 156 | — |
| VI | Activated Carbon | 4 | 6 | 8 | 10 | — |

[1]Dealuminated type Y zeolite

An examination of the results recorded in the Table show that type 5A zeolite provided excellent nitrogen dioxide adsorption during the entire test period, the product gas passing through the type 5A zeolite containing no detectable nitrogen dioxide at any time during the five hour test period. The type 4A and type 13X zeolites provided significantly better nitrogen dioxide adsorption than the activated carbon sample, and the DAY zeolite and silica samples produced the poorest test results.

Although the invention has been described with particular reference to a specific examples, the examples are merely representative of the invention and variations are contemplated. For instance, mixtures of two or more zeolites can be used as the adsorbent or two or more adsorbents can be used in tandem in the process of the invention. The scope of the invention is limited only by the breadth of the appended claims.

What is claimed is:

1. A process for purifying a substantially oxygen-free nitric oxide gas stream containing nitrogen dioxide at a nitric oxide to nitrogen dioxide molar ratio of at least about 5:1 comprising passing said gas stream through a bed of particulate zeolite having a silica to alumina ratio of not greater than about 200:1, thereby adsorbing nitrogen dioxide and producing a nonadsorbed nitric oxide gaseous product containing not more than about 5 ppm nitrogen dioxide.

2. The process of claim 1, wherein said zeolite is selected from 5A zeolite, 13X zeolite, 4A zeolite and mixtures of these.

3. The process of claim 2, wherein said zeolite is 5A zeolite.

4. The process of claim 1, wherein said gas stream comprises nitric oxide and nitrogen.

5. The process of claim 4, wherein the concentration of nitric oxide in said gas stream is at least 80% by volume.

6. The process of claim 1, wherein said nitric oxide gaseous product is diluted with inert gas selected from nitrogen, argon and mixtures of these sufficiently to produce a gas mixture containing about 5 to about 5000 ppm nitric oxide.

7. The process of claim 6, wherein said nitric oxide gaseous product is diluted with said inert gas sufficiently to reduce the concentration of nitrogen dioxide in said gas mixture to not more than about 1 ppm.

8. The process of claim 6, further comprising blending said gas mixture with a gas selected from oxygen or oxygen-enriched air to produce a blended mixture containing about 1 to about 100 ppm nitric oxide.

9. A process for preparing an inert gas-nitric oxide gaseous product containing about 5 to about 5000 ppm of nitric oxide and not more than about 5 ppm of nitrogen dioxide comprising passing a substantially oxygen-free nitric oxide gas stream containing nitrogen dioxide at a concentration such that the molar ratio of nitric oxide to nitrogen dioxide is at least about 5:1 through a bed of particulate zeolite selected from type 5A zeolite, type 4A zeolite, type 13X zeolite and mixtures of these, thereby adsorbing nitrogen dioxide from said stream, and diluting the nitrogen dioxide-depleted stream with an inert gas sufficiently to produce said gaseous product.

10. The process of claim 1 or claim 9, wherein the nitrogen dioxide is present in said gas stream at a concentration of up to about 5000 ppm.

11. The process of claim 1 or claim 9, additionally comprising reducing the concentration of nitrogen dioxide in said gas stream to less than about 5000 ppm prior to passing it through said bed of particulate zeolite by scrubbing the gas stream with an aqueous liquid, or by subjecting the gas stream to cryogenic distillation or by a combination of these procedures.

12. The process of claim 1 or claim 9, wherein said gas stream contains water vapor and additionally comprising removing water vapor from said gas stream to the extent that the concentration of water vapor in said gaseous product does not exceed about 20 ppm.

13. The process of claim 11, wherein said gas stream contains water vapor and additionally comprising removing water vapor from said gas stream to the extent that the concentration of water vapor in said gaseous product does not exceed about 20 ppm.

14. The process of claim 12, wherein the water vapor removal is effected as said gas stream passes through said bed of zeolite.

15. The process of claim 12, wherein the water vapor removal is effected by passing said gas stream through a bed of water-selective absorbent prior to passing the gas through said bed of zeolite.

16. The process of claim 15, wherein said water-selective adsorbent is alumina, silica or mixtures of these.

17. The process of claim 9, wherein said particulate zeolite is type 5A zeolite.

18. A process for preparing an inert gas-nitric oxide gaseous product containing not more than about 5 ppm of nitrogen dioxide comprising blending a substantially oxygen-free nitric oxide gas stream containing nitrogen dioxide at a concentration such that the molar ratio of nitric oxide to nitrogen dioxide in said gas stream is at least about 5:1 with sufficient inert gas to reduce the concentration of nitric oxide in the resulting gas mixture to about 5 to about 5000 ppm, and passing said gas mixture through a bed of particulate zeolite having a silica to alumina ratio of not greater than 200:1.

19. The process of claim 18, wherein said zeolite is selected from 5A zeolite, 13X zeolite, 4A zeolite and mixtures of these.

20. The process of claim 19, wherein said zeolite is 5A zeolite.

21. The process of claim 9 or claim 19, wherein said inert gas is selected from nitrogen, argon and mixtures of these.

22. The process of claim 21, wherein said inert gas is nitrogen.

23. The process of any one of claims 1, 9 or 18, wherein said substantially oxygen-free nitric oxide gas stream contains at least about 1% by volume nitric oxide.

24. The process of claim 23, wherein the molar ratio of nitric oxide to nitrogen dioxide in said substantially oxygen-free nitric oxide gas stream is at least about 10:1.

25. The process of claim 24, wherein said substantially oxygen-free nitric oxide gas stream contains at least about 3% by volume nitric oxide.

* * * * *